Feb. 26, 1957  R. U. BLASER  2,782,772
VAPOR GENERATOR AND LIQUID FLOW MEANS THEREFOR
Filed July 6, 1951  2 Sheets-Sheet 1

INVENTOR
Robert U. Blaser
BY
W. Holbrook
ATTORNEY

Feb. 26, 1957 R. U. BLASER 2,782,772
VAPOR GENERATOR AND LIQUID FLOW MEANS THEREFOR
Filed July 6, 1951 2 Sheets-Sheet 2

INVENTOR
Robert U. Blaser
BY
ATTORNEY

United States Patent Office 2,782,772
Patented Feb. 26, 1957

2,782,772

VAPOR GENERATOR AND LIQUID FLOW
MEANS THEREFOR

Robert U. Blaser, Alliance, Ohio, assignor to The Babcock & Wilcox Company, Rockleigh, N. J., a corporation of New Jersey Application July 6, 1951, Serial No. 235,532

6 Claims. (Cl. 122—406)

This invention is concerned with the flow of feed water into the stream and water drum of a steam generating unit having downflow of water at the end, or ends, of the drum.

More specifically, the invention is concerned with the prevention of disturbance of the optimum flow of water in the steam and water drum to a large diameter downcomer at the end of the drum. The pertinent disturbance is that which might be otherwise caused by the flow of feed water into the drum at a position near the inlet of the downcomer. To prevent such disturbance, the invention provides, at the discharge end of the feed water pipe (in the drum), flow distribution and directing means which dissipates the energy of the incoming feed water, directs its flow toward the downcomer inlet, and distributes the feed water flow.

The apparatus embodying such means includes a whirl chamber, a directional spout secured to the whirl chamber below its outlet and directing the water discharge toward the downcomer inlet, and a flow distributing device disposed transversely of the water discharge from the spout and having a multiplicity of flow openings.

The invention will be described with reference to the accompanying drawings in which a preferred embodiment is illustrated.

Figure 1:
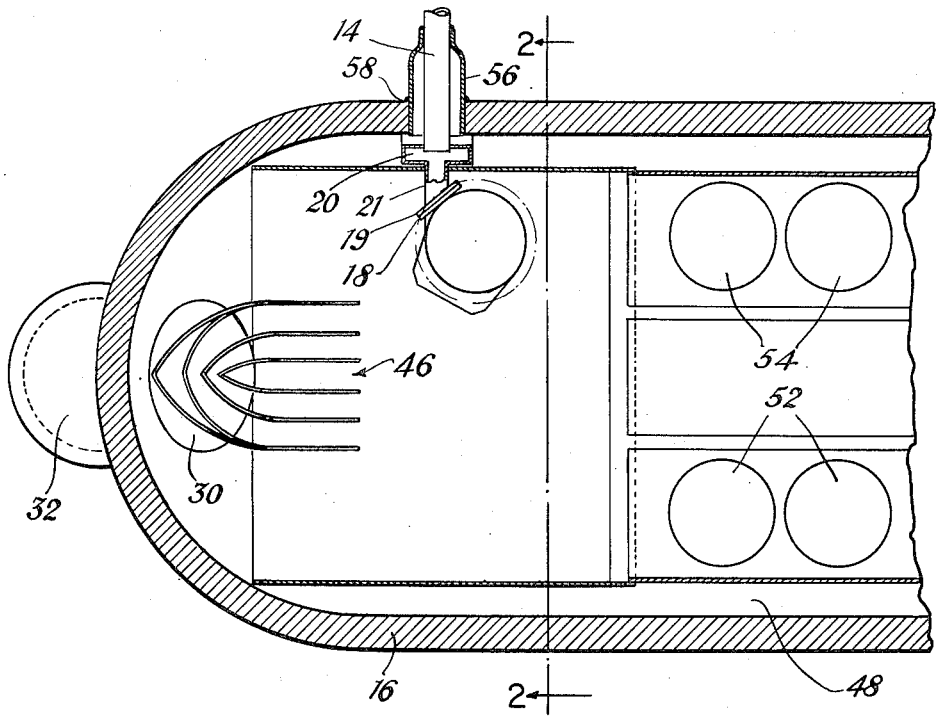
Fig. 1 is a fragmentary horizontal section of a steam and water drum of a steam generator with the invention applied thereto.
Figure 2:
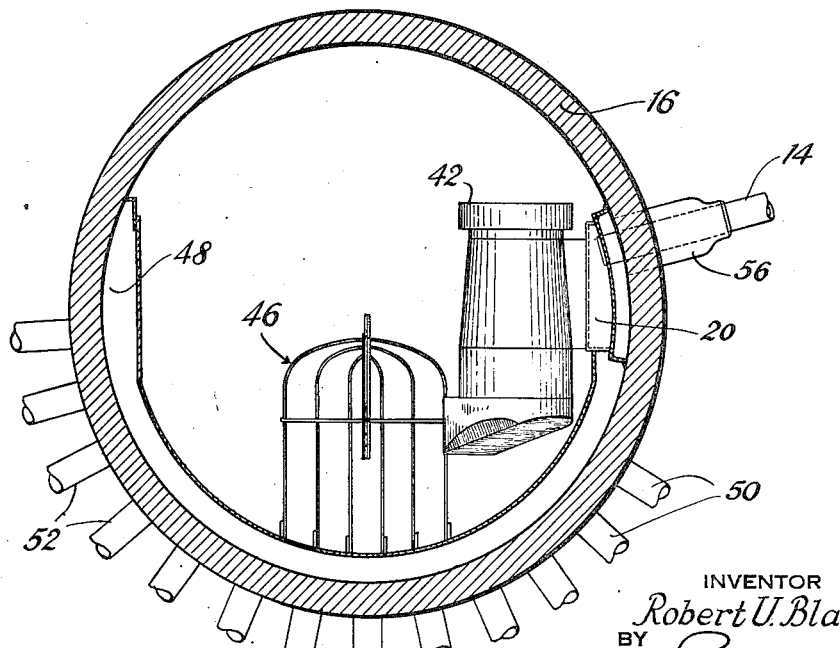
Fig. 2 is a transverse vertical section, on the line 2—2 of Fig. 1, looking in the direction of the associated arrows.

The illustrative flow distributor and energy dissipator includes a whirl chamber 10 having a side inlet 12 through which a liquid or liquid and vapor mixture flows substantially tangentially into the whirl chamber. In Figs. 1 and 2 this inlet receives the discharge from a feed water pipe 14 extending through the wall of the drum 16. The inlet has a flange 18 which is secured to a corresponding flange 19 fixed to the outlet 21 of a chamber 20 into which the feed water pipe 14 discharges, as shown.

The whirling liquid is discharged from the whirl chamber through an annular outlet 22 in which inclined vanes 24 are disposed. The latter are secured to the whirl chamber wall and to the bottom member, as by welding or brazing.

Figure 4:
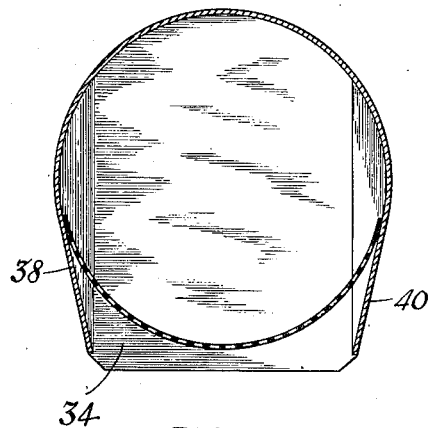
Fig. 4 is a horizontal section on the line 4—4 of Fig. 3.
Figure 6:
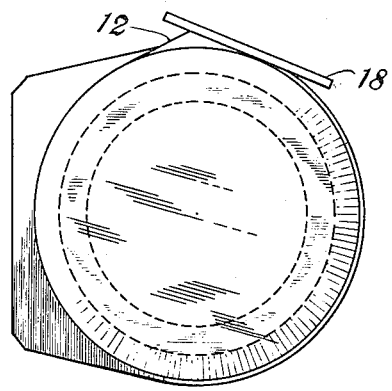
Fig. 6 is a plan of the Fig. 5 structure with the cap baffle removed.
Figure 3:
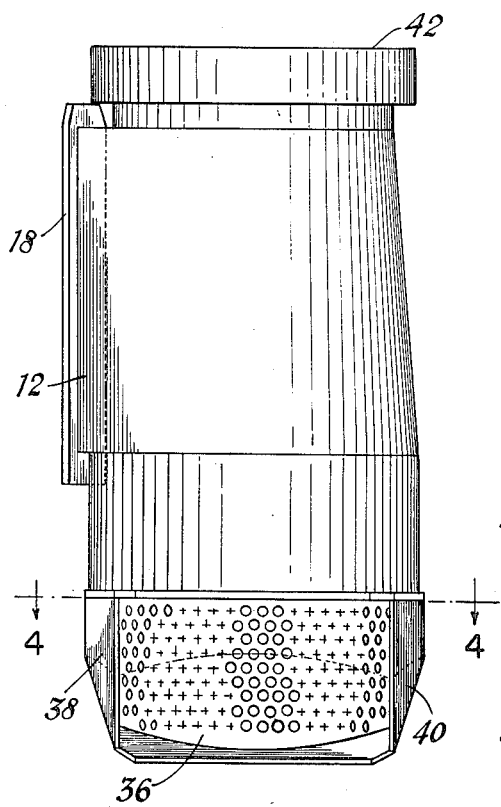
Fig. 3 is a front elevation of the illustrative flow distributor and energy dissipator.
Figure 5:
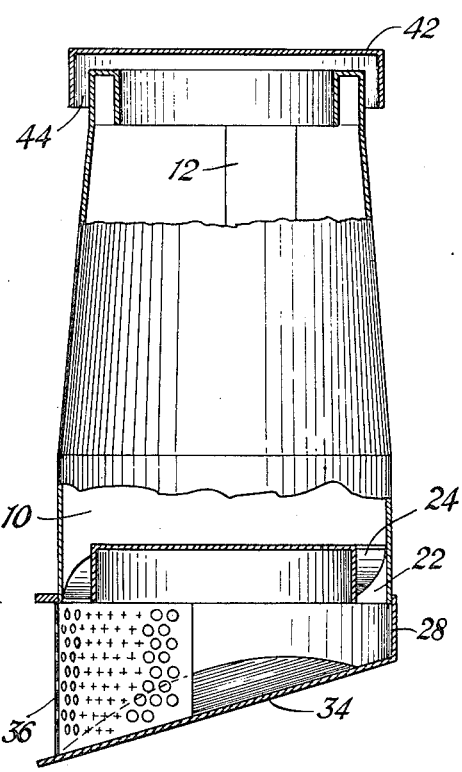
Fig. 5 is a side elevation of the apparatus of Fig. 3, with the lower part broken away to show the adjacent structure in vertical section.

Beneath the whirl chamber outlet is a directional spout 28, secured to the body of the whirl chamber and directed toward the water flow toward the inlet 30 of the downcomer 32, as indicated in Fig. 1. The bottom 34 of the spout inclines downwardly toward its outlet where a flow distributing element or plate 36 is fixed in position transversely of the liquid flow, as particularly shown in Fig. 5. This element is shown in Figs. 3, 4, and 5, as a perforated plate extending entirely over the flow area of the spout outlet. It is preferably curved as indicated in Fig. 4, and may be welded or brazed to the upright sides 38 and 40 of the spout, to the bottom of the spout, and to the whirl chamber body. This perforated flow equalizing plate distributes the spout discharge which would otherwise have a tendency, due to the whirling action of the fluid within the whirl chamber, to concentrate toward one of the upright spout sides 38 or 40.

The plate 36 also dissipates the energy of the discharge so as to avoid interference with the optimum longitudinal flow of water toward the downcomer 32, in the drum 16.

At the top of the whirl chamber there is a cap baffle 42 providing an impingement surface. It is formed as a downwardly flanged cover spaced upwardly and outwardly of the top of the whirl chamber to provide an annulus 44 around the rim of the cyclone for the passage of small amounts of steam that may be generated in the economizer under abnormal operating conditions.

Figs. 1 and 2 show the vortex inhibitor 46 at the inlet 30 of the downcomer 32, and these Figures also show the steam and water auxiliary chamber 48, into which steam and water mixtures are normally discharged at high velocity from the ends of the steam generating tubes 50. Such mixtures flow at high velocities through whirl chamber separators which are diagrammatically indicated at 52 and 54.

Figs. 1 and 2 also show a thermal sleeve connection 56 around the feed waterpipe 14, and welded thereto and to the drum, as at 56 and 58.

Whereas in accordance with the revised statutes the invention has been described with reference to certain preferred embodiments, it is to be appreciated that the invention is not limited to all of the details thereof, but that it is rather of a scope corresponding to the scope of the subjoined claims.

What is claimed is:

1. In a steam generator of the type including a horizontally elongated steam and water drum, steam generating riser tubes discharging steam and water mixtures into the drum at positions distributed throughout a major part of the length of the drum, a large diameter downcomer communicating with an end portion of the drum and leaving a major part of the drum length without a downcomer, thereby compelling the water within the drum to flow longitudinally over a substantial part of the length of the drum to reach a downcomer, and a feedwater inlet tube connection through the drum wall near the inlet of the downcomer and between that inlet connection and said positions; the combination therewith of a whirl chamber having a whirl producing inlet portion communicating with the feedwater inlet tube connection, a directional spout secured to the outlet portion of the whirl chamber and directing the water discharged from the whirl chamber outlet toward the downcomer inlet; and flow distributing and velocity dissipating means extending across the flow of fluid at the outlet of the spout.

2. In a vapor generator of the type including an horizontally elongated liquid and vapor drum, vapor generating riser tubes discharging liquid and vapor mixtures into the drum at positions distributed throughout a major part of the length of the drum, a large diameter downcomer communicating with an end portion of the drum beyond said positions and leaving a major part of the drum length without a downcomer and thereby compelling the liquid to flow longitudinally over a substantial part of the drum length to reach a downcomer, and a feed liquid inlet tube connection through the drum wall near the downcomer inlet and between that inlet connection and said positions; the combination therewith of a whirl chamber disposed adjacent the downcomer and having a whirl producing inlet portion communicating with the feed liquid inlet tube connection, a directional spout secured to the whirl chamber and directing the liquid discharge from the whirl chamber outlet toward the downcomer inlet, and flow distributing and velocity dissipating means extending across the flow of liquid at the outlet of the spout.

3. In a steam generator of the type including an horizontally elongated steam and water drum, steam generating riser tubes discharging steam and water mixtures into the drum at positions distributed throughout a major part of the length of the drum, a large diameter downcomer communicating with an end portion of the drum beyond said positions and leaving a major part of the drum length without downcomer and thereby compelling the water to flow longitudinally over a substantial part of the drum length to reach a downcomer, and a feedwater inlet tube connection through the drum wall near the downcomer inlet and between that inlet and said positions; the combination therewith of a whirl chamber disposed adjacent the downcomer and having a whirl producing inlet portion communicating with the feedwater inlet tube connection, a directional spout secured to the whirl chamber and directing the water discharge from the whirl chamber outlet toward the downcomer inlet, and a perforated plate forming a flow distributing and velocity dissipating means extending across the flow of liquid at the outlet of the spout.

4. In a steam generator of the type including an horizontally elongated steam and water drum, steam generating riser tubes discharging steam and water mixtures into the drum at positions distributed throughout a major part of the length of the drum, a large diameter downcomer communicating with an end portion of the drum beyond said positions and leaving a major part of the drum length without a downcomer and thereby compelling the water to flow longitudinally over a substantial part of the drum length to reach a downcomer, and a feedwater inlet tube connection through the drum wall near the downcomer inlet and between that inlet and said positions; the combination therewith of a whirl chamber having a whirl producing inlet portion communicating with the feedwater inlet tube connection, a directional spout secured to the outlet portion of the whirl chamber and directing the water discharge from the whirl chamber outlet toward the downcomer inlet, and flow distributing and velocity dissipating member extending across the flow of liquid at the outlet of the spout, said member forming a barrier having a multiplicity of openings for water flow.

5. In an apparatus of the character described, wall means presenting a whirl chamber having a whirl producing inlet portion normally receiving the flow of high velocity liquid, the whirl chamber having an annular fluid outlet with its outer margin radially adjacent the lower part of the whirl chamber wall, a downwardly flanged imperforate cap baffle secured in upwardly spaced relation to the top of the whirl chamber with its flange spaced radially outwardly of the whirl chamber top to provide therebetween a restricted vapor outlet at the top of the whirl chamber, a laterally and downwardly directed channel-like spout secured to the whirl chamber directly beneath the outlet and normally receiving all of the fluid discharged through the outlet and causing the fluid to flow laterally in a direction substantially radially to the whirl chamber, and a flow distributing and velocity dissipating perforated plate extending across the path of flow through the spout.

6. In apparatus of the character described, wall means presenting a circular whirl chamber having a whirl producing inlet portion normally receiving the high velocity flow of the fluid, the whirl chamber having an annular fluid outlet with its outer margin radially adjacent the lower part of the whirl chamber wall, a downwardly flanged circular cap baffle spaced above the top of the whirl chamber and having its flange spaced radially outwardly of the top of the whirl chamber to provide an annular vapor outlet, the cap baffle having a flat and substantially imperforate top, and downwardly and laterally directed channel-like spout means secured to the whirl chamber directly beneath the outlet and normally receiving all of the liquid discharged through the outlet and causing the liquid to flow laterally in a direction substantially radially of the whirl chamber, and flow distributing and velocity dissipating means in the form of a transverse perforated plate extending across the radial outlet of the spout.

References Cited in the file of this patent

UNITED STATES PATENTS

| | | |
|---|---|---|
| 565,986 | Hogan | Aug. 18, 1896 |
| 994,167 | Koppitz | June 6, 1911 |
| 1,717,015 | Edge | June 11, 1929 |
| 1,719,119 | McKain | July 2, 1929 |
| 1,854,583 | Friedrich | Jan. 19, 1932 |
| 1,897,727 | Hughes et al. | Feb. 14, 1933 |
| 2,007,966 | Fletcher | July 16, 1935 |
| 2,106,589 | Bigger et al. | Jan. 25, 1938 |
| 2,169,935 | Vorkauf | Aug. 15, 1939 |
| 2,187,646 | Darrieus | Jan. 16, 1940 |
| 2,298,285 | Fletcher | Oct. 13, 1942 |
| 2,316,764 | Hardgrove | Apr. 20, 1943 |
| 2,316,765 | Hobbs | Apr. 20, 1943 |
| 2,320,343 | Bailey | June 1, 1943 |
| 2,368,211 | Fletcher | Jan. 30, 1945 |
| 2,368,632 | Blizard | Feb. 6, 1945 |
| 2,402,154 | Fletcher | June 18, 1946 |
| 2,434,663 | Letvin | Jan. 20, 1948 |
| 2,578,831 | Patterson | Dec. 18, 1951 |
| 2,648,397 | Ravese | Aug. 11, 1953 |

FOREIGN PATENTS

| | | |
|---|---|---|
| 687,910 | France | May 5, 1930 |